ent Office 2,794,057
Patented May 28, 1957

2,794,057
PROCESS FOR RECLAIMING RUBBER

Arnold Gunther, Buenos Aires, Argentina

No Drawing. Application January 24, 1952,
Serial No. 268,120

2 Claims. (Cl. 260—714)

The present invention relates to a process for the separation of cotton, rayon, nylon, or other fibers from the vulcanized rubber contained in scrap rubber such as old vehicle tires.

The present application is a continuation in part of copending application Serial No. 112,175, filed August 24, 1949, and now abandoned.

Heretofore processes are known which dissolve the fiber leaving the rubber apparently unaltered or which dissolve the fiber during the process of reclaiming the rubber. Examples of this type of process are the so called acid and alkali processes which require special installations of lead tanks for the acid, and considerable expense is involved for the combustion materials to produce the solubility. In addition there is the inconvenience that the rubber always absorbs some acid in spite of cautious washing of the same, and these traces of acid are damaging to the rubber. Processes are also known which dissolve the rubber leaving the fiber unaltered. Here the rubber is dissolved by the heating of various solvents such as naphtha, benzol, toluene, creosotes, etc. Here the heating costs to dissolve the rubber are considerable, with the great inconvenience of leaving a rubber precipitation of different quality from the original material, and also the extraction of the used solvents is expensive. Various known mechanical processes are based generally on the separation of the fibers from the scrap rubber previously ground by means of air currents at adequate speeds. While this mechanical process does not require heat, the quality of separated rubber, however, is low and a great part of the small rubber particles are lost among or on the separated fibers. In addition the separated portion of rubber is not free of fiber, but on the contrary is very impure.

In summary the processes actually in use can be classified in the order of their physical phenomena on which the separation is based, as for instance processes based on the solubility of one of the two components, rubber and fiber, of the rubber scrap; and processes based on the expulsion of the fibers from the previously ground scrap by the use of air currents.

The most important defects of the aforementioned processes are, firstly, the considerable expense in fuel cost, and, secondly, the recovered rubber is not completely free of fibers and therefore not pure.

Applicant's process eliminates the aforementioned defects, because it reduces the fuel costs to a minimum, even eliminating this item entirely as will be explained. The result is rubber practically free of fiber and fiber practically free of rubber. It is therefore an object of applicant's invention to provide a process for the separation of the rubber from the fibers, comprising the floating and sinking of one or the other of the components respectively in a liquid medium of intermediate density of the "temporary" or "accidental" densities of both components.

By "temporary" or "accidental" density is meant that one or both components during a phase or step of the process acquire a different density from that which they normally have as components of the scrap.

My process will now be explained in its essential details.

In the first stage of the process, the scrap is ground by any usual means to a convenient screen or sieve, so as to bring the ground scrap to such a particle size that both rubber and fiber particles will be practically free one from another, being obviously the rubber and fiber particles in a mixed condition.

To be still more precise, it may be stated that the size of these particles is preferably, although not obligatorily, more or less equal to the size of a 30 mesh sieve, but without any necessity of uniformity in size.

In the next step the ground material absorbs a definite quantity of a liquid which is easily absorbed by the rubber, and as preferred liquids to use for this purpose are the solvent liquids for rubber or a liquid swelling agent, such as naphthas, benzenes, toluenes, etc.

The absorption of the liquid solvent or the swelling agent may be accomplished by placing the ground material in containers which are then filled with the liquid solvent.

If vulcanized rubber is processed, not one of the mentioned liquid solvents is able to dissolve or disperse the rubber irrespectively of the time of contact. This insolubility of vulcanizers to the usual "uncured rubber" solvents is well known.

Furthermore, the absorption is made at room temperature, and at such temperature only swelling of the vulcanized rubber occurs.

If waste consisting of non-vulcanized rubber is processed, the dissolution of the same in the solvent is a question of time of contact, and with a proper regulation of this time of contact or of immersion, it is possible to obtain a swollen rubber without dissolution or dispersion of the same.

As adequate time limits for such contacts are already well known from technical literature, details about this point may be dispensed with.

Extracting the residual liquid solvent from the containers by any convenient means, such as filtering through a sieve, the ground material with the swollen rubber particles is obtained. The degree of swelling is dependent, for non-vulcanized rubber, upon the time of contact.

With this type of rubber (uncured) it is possible to obtain all the variations from lightly swollen rubber to dissolved rubber.

With vulcanized rubber the matter is entirely different because the quantity of solvent absorbed by the rubber particles reaches a determinate limiting value (in the rubber of old tires this limiting value is more or less of 100 parts by weight of solvent for every 100 parts by weight of rubber), the liquid solvent being a petroleum liquid derivative of 0.765 gr./cc. density. The rubber particles treated in this manner do not enter into dissolution, only being swollen and remaining in the original granular state as in the ground material, the actual volume being greater than before absorption.

When, by reasons of economy in the evaporation of the solvent absorbed by the rubber it is desired to reduce the quantity absorbed to values less than the limiting one mentioned, recourse is made to the "spraying" of the liquid solvent onto the ground material. One means of carrying out this operation is by the use of the so-called "spray nozzles" and directing the spray onto the ground material placed on moving or running belts, taking care that the ground material is well distributed over the belts and that the width is the least possible. Regulating the belt velocity or the quantity of the solvent sprayed, or both, one can absorb by the rubber any determinate quantity of the solvent. The quantities absorbed are in an inverse rate to the density of the swollen rubber. Rubber of the tire with a 25% absorption (25 parts by weight of solvent for 100 parts by weight of rubber) will take a density of about 1.1 gr./cc. while with an absorption of 100% the density is about 0.9 gr./cc. These densities are responsible for the election of the medium liquid in which the separation of rubber and fiber will be performed, because it is necessary for this purpose that the liquid medium be of a density which is intermediate, or the density of which lies between those of the swollen rubber particles and the fibers.

In order that the swollen particles will float in the liquid and that the fibers will sink, the density of the liquid medium must be chosen to be less than that of the fiber density and greater than that of the swollen rubber density. In the first case mentioned (25% absorption) a liquid with a density greater than 1.1 gr./cc. must be chosen, such as a mixture of water and glycerine, in which glycerine is in a proportion of 45% or more by weight. In the second case (100% absorption) water alone is sufficient because in this case the swollen rubber has a density of 0.9 and water about 1. Cotton fiber density (to mention cotton as an example) being about 1.5 gr./cc., and therefore greater than the two previously mentioned (1 and 1.1), cotton will always sink.

Scrap rubber from tires has an average density of 1.2 grams per cubic centimeter, and as the solvent liquid or the liquid swelling agent is absorbed by the rubber, the latter begins to swell, thereby reducing its density. This reduction in density of the rubber increases as the percentage of the absorption of liquid increases, and with a convenient regulation of the absorption percentage the rubber plus the absorbed liquid will have a lesser temporary density than the liquid medium in which the separation of both components is made. The cotton fibers (still to cite cotton as an example, as it is the most common one) with a constant average density of 1.5 grams per cc., absorb also a certain percentage of the solvent liquid or of the liquid swelling agent, because a certain absorption percentage by the rubber corresponds to a certain absorption percentage of the fibers and the latter percentage is less than the first one (rubber).

Consequently the temporary density of the cotton plus the absorbed solvent liquid or the liquid swelling agent is greater than the temporary density of the rubber plus the absorbed liquid. It is precisely this difference of the temporary densities which permits an efficient separation of both components in a liquid medium, the density of which is intermediate between the two different densities which have been previously mentioned.

In the next or third step of the process the ground mixture of both components together with their respective percentages of absorbed solvent liquids or liquid swelling agents is placed in tanks containing the liquid medium of intermediate density, previously mentioned (generally water or water mixed with glycerine, or any other liquid which is harmless to the two components and to the absorbed solvent liquid or the liquid swelling agent), and where by means of adequate agitators the separation of the two components is made. By gravitation two different portions are formed; in the upper part of the liquid medium contained in the tank, there is the floating rubber because of its lesser temporary density in relation to the density of the liquid in the tank, in the lower part there is the fiber. By convenient means each portion is separately conducted or conveyed into filter devices where the greatest possible quantity of the liquid medium is extracted.

In the final step each of the components already separated and treated by adequate filtering devices is also treated by adequate means involving evaporation or extraction in order to recover the absorbed liquid solvent of the liquid swelling agent.

The possibility of avoiding the fuel requirements and expenses were mentioned, as in the final step it is wished to explain the point why the prior steps are made under normal temperatures. In the rubber industry the scrap to be reclaimed is placed into a liquid alkaline or acid medium, and everything together the liquid and rubber system is heated to more than 100° C. The used liquid solvent or the liquid swelling agent in the process generally has a boiling point below 100° C. so that it readily evaporates by making only the necessary adjustment in the autoclaves used in order to give an exit to this evaporated solvent and conducting it out of the autoclaves into appropriate condensers with no special expense.

I claim:

1. A process for reclaiming vulcanized rubber from the fibers of used tires comprising the steps of reducing the used tires into small particles of such size that the vulcanized rubber particles will be substantially free from the fiber particles, applying at room temperatures, a liquid swelling agent for vulcanized rubber to the reduced particles of vulcanized rubber and fibers whereby the rubber particles are swollen by the said liquid swelling agent, separating the swollen vulcanized rubber particles from the fibers in an aqueous medium having a density intermediate between that of the swollen vulcanized rubber and the fibers, the swollen rubber being lighter and the fibers being heavier than the said medium, said aqueous medium being adapted to resist chemical reaction at room temperature with the liquid swelling agent for vulcanized rubber, the fibers and the vulcanized rubber, and finally recovering said liquid swelling agent from the separated vulcanized rubber particles and from the separated fibers.

2. A process for separating vulcanized rubber from the fibers of used tires comprising grinding the used tires to reduce them to mixed particles of vulcanized rubber substantially free from fibers and fibers substantially free from vulcanized rubber, applying at room temperature, a liquid swelling agent for vulcanized rubber to the particles in the mixed state whereby the rubber particles are swollen by the said liquid swelling agent, regulating the quantity of the liquid swelling agent absorbed by the vulcanized rubber particles whereby a predetermined density of these swollen rubber particles of at least equal to that of wholly liquid swelling agent saturated rubber particles is obtained, conveying the vulcanized rubber and fiber particles with their absorbed liquid swelling agent for vulcanized rubber into an aqueous medium having an intermediate density relative to the densities of the swollen rubber and the fibers, the fibers and the vulcanized rubber separating in the aqueous medium by the swollen vulcanized rubber particles floating and the fibers sinking as a consequence of their densities differences, and finally recovering said absorbed liquid swelling agent from the separated vulcanized rubber and from the separated fibers.

References Cited in the file of this patent

UNITED STATES PATENTS

| | | |
|---|---|---|
| 281,769 | Kent | July 24, 1883 |
| 931,121 | Hunicke | Aug. 17, 1909 |
| 982,373 | Lawrence | Jan. 24, 1911 |
| 1,321,200 | Furness | Nov. 11, 1919 |
| 1,424,668 | Navone | Aug. 1, 1922 |
| 1,900,944 | Mitchell | Mar. 14, 1933 |
| 1,953,150 | Bull | Apr. 3, 1934 |
| 2,284,142 | Gray | May 26, 1942 |
| 2,321,114 | Tefft | June 8, 1943 |
| 2,324,980 | Kilbourne | July 20, 1943 |
| 2,447,733 | Campbell | Aug. 24, 1948 |